Sept. 27, 1960 D. R. CARMODY 2,954,338
PROCESS FOR MONITORING A SOLID ADSORPTION
PROCESS BY RADIOACTIVE MEANS
Filed June 24, 1955
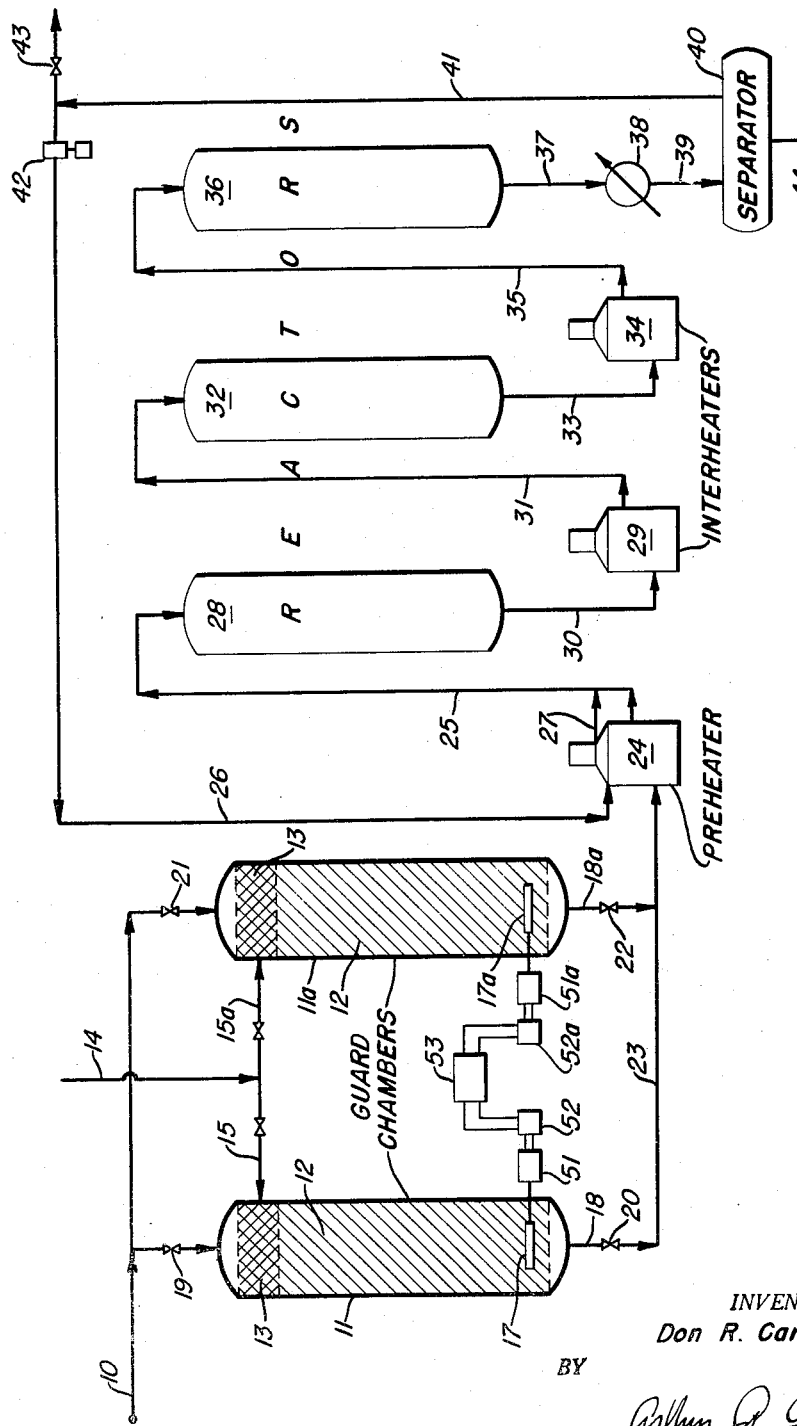
INVENTOR.
Don R. Carmody
BY
Arthur J. Gilkes
ATTORNEY

United States Patent Office 2,954,338
Patented Sept. 27, 1960

2,954,338

PROCESS FOR MONITORING A SOLID ADSORPTION PROCESS BY RADIOACTIVE MEANS

Don R. Carmody, Crete, Ill., assignor to Standard Oil Company, Chicago, Ill., a corporation of Indiana Filed June 24, 1955, Ser. No. 517,713

8 Claims. (Cl. 208—91)

My invention relates to improvements in the operation of catalytic processing systems. In its broader aspects, it provides improved means for protecting sensitive catalysts in such systems from the harmful effects of poisons which may be present in trace amounts in feed streams. In a more specific aspect, it provides an improved process for reforming hydrocarbon charge stocks in the presence of a platinum type catalyst wherein the removal of contaminating poisons from a charge stream prior to contact with the catalyst is monitored by radioactive means.

The economic operation of many catalytic processes depends to a significant extent upon protection of the body of catalyst in the reaction zone from contact with catalyst poisons which may be introduced with a feed stream, fresh or recycle, to the process. The most troublesome contaminants may be present in trace amounts in the process feed as in the case of most petroleum charge stocks which normally contain in combined form minute concentrations of metals such as sodium, arsenic, molybdenum, vanadium, for example, as well as varying amounts of combined sulfur and nitrogen.

In continuous flow processes in which recycle streams are returned to the reaction zone, the initial concentration of the contaminant in the feed may not be harmful, but build-up on the catalyst body by adsorption may produce cumulative effects resulting in yield or quality loss, and which ultimately may shut down the unit. A particularly serious problem in reforming in the presence of platinum type catalysts has been the presence of even seemingly minute concentrations of arsenic in the hydrocarbon feed. There have been instances where arsenic poisoning has been so critical that commercial plants have never reached their anticipated performance level.

A conventional method of feed purification is to pass the feed stream through a guard chamber before introducing it to the reaction zone containing the catalyst. The guard chamber may contain an acid or caustic bath for scrubbing the feed, but advantageously may contain a body of solid adsorbent material which will remove contaminants from the feed by selective adsorption. In any case, the material used for purifying the feed stream tends to lose capacity as a function of time and the concentration of contaminants in the feed. It is essential therefore to know when the purification material is approaching the spent stage so that it can be reactivated, or the guard chamber replaced with fresh material.

According to my invention, the adsorptive capacity of the purification material and its approach to exhaustion are monitored by radioactive means. A radioactive isotope of the contaminant to be removed from the feed is introduced to a purification zone at a point near the feed inlet, and the radioactivity of the feed stream flowing through the zone is measured down stream at a point near its discharge from the zone. A suitable record is made or signal provided so that flow may be shut down or diverted to another purification zone when breakthrough of the radioactive contaminant is indicated. The radioactive isotope may be introduced continuously or intermittently in extremely minute quantities, but advantageously it is introduced by admixture with adsorbent material at the top of an adsorption bed arranged in the purification zone for adsorptive contact with the feed stream.

The invention will be further described by a specific example illustrating operation of the invention applied as indicated on the flow diagram of the accompanying drawing.

In the accompanying drawing, simplified flow through a catalytic reforming unit of 5000 bbls./day capacity is illustrated in diagrammatic form. The feed to the unit constitutes a virgin Pennsylvania naphtha having an arsenic concentration, for example, of 5 to 50 p.p.m. The naphtha charge, boiling in the range of about 150 to 400° F., is passed from line 10, downflow as shown, through one of a pair of guard chambers 11 and 11a. The guard chambers each contain a solid adsorbent bed 12 comprising, for example, 5–30 mesh bauxite. The top layer of the adsorbent bed, indicated at 13, is treated with a radioactive isotope of arsenic, e.g. arsenic-73, in an amount providing about 1 to 10 microcuries per square foot of cross section. The concentration of the radioactive isotope is not critical but should be limited in the interest of safety. By way of example, the oxide of arsenic-73 or arsenic-74 or admixtures thereof may be employed with advantage. The arsenic isotope is conveniently added by impregnation with a solution of its oxide in a dilute aqueous acid or base; e.g. hydrochloric acid, through injection lines 15 and 15a. Alternatively, the radioactive arsenic may be injected continuously or intermittently into the onstream guard chamber through lines 14 and 15 (or 15a) in oil soluble form. For example, a dilute solution of a hydrocarbon soluble arsenic compound such as the triiodide of arsenic 73–74 in a portion of the naphtha feed may be used.

As the adsorbent in bed 12 removes contaminating arsenic from the feed stream, the radioactive isotope is displaced and gradually moves down the bed, apparently by the mechanism of exchange with the arsenic compounds in the feed. In order to detect the presence of radioactivity in the lower portion of the bed, a suitable device such as a Geiger counter 17 (and 17a) is installed in bed 12 near the point of discharge into effluent line 18. In place of Geiger counters 17, other known devices for detecting radioactivity, e.g. ionization chambers, scintillation counters or the like, may be used. The detector is operatively connected to a scaler or count rate meter 51 (and 51a) and, advantageously, via a relay 52 (and 52a) to a recorder 53, or to an alarm or other warning device. Thus, when a level of radioactivity is detected which exceeds a predetermined amount associated with advance of radioisotope front, the operator receives warning that the adsorbent requires replacement or reactivation. In establishing the predetermined value, allowance should be made for the average radioactive "background" of the system as well as the properties and concentration of the radioisotope used as a tracer.

When the radioisotope front reaches detector 17 (or 17a), the feed stream is switched from guard chamber 11 to guard chamber 11a containing fresh adsorbent by closing valves 19 and 20 and opening valves 21 and 22. Guard chamber 11a, like guard chamber 11, is equipped with means for introducing the radioisotope and for detecting the presence of radioactivity near the outlet end of the chamber as indicated above.

The effluent feed stream from guard chamber 11 (or 11a) is passed by line 23 through fired heater 24 into reactor inlet line 25. Recycle hydrogen gas from line 26 is passed through a coil in the convection section of heater 24 and is introduced to reactor inlet line 25 by connection 27. The combined feed and hydrogen recycle stream is passed through reactor 28 which contains a bed of particle-form, platinum-alumina reforming catalyst.

In fixed bed catalytic reforming, it is desirable to compensate for endothermic temperature drop by using a plurality of reactors which are serially arranged with interheating facilities. Thus, the effluent from reactor 28 is passed through interheater 29 by means of lines 30 and 31 and is then introduced to reactor 32. From reactor 32, the effluent is passed via line 33 through interheater 34 and via line 35 is introduced to reactor 36. The effluent from reactor 36 is passed by connections 37, cooler 38, and connection 39 to separator 40. Hydrogen rich gas is flashed from separator 40 into line 41. Approximately 5000 cubic feet per barrel of feed of hydrogen rich gas is recycled by means of compressor system 42. Net make gas is vented from the system through valved line 43. The liquid reformate is recovered from separator 40 by means of line 44 and is passed to stabilization and/or other conventional processing facilities.

Reforming conditions are adjusted to the severity required for the type of feed and the desired product octane level. For example, a temperature in the range of about 900 to 1000° F. is maintained at a space velocity in the range of about 0.5 to 5 expressed in terms of weight of feed per weight of catalyst in the reaction zone per hour. An elevated pressure in the range of about 100 to 750, advantageously from about 200 to 300 p.s.i.g. is maintained on the system. Recycle hydrogen rate may vary from about 2,000 to 10,000 cubic feet per barrel. Although the reforming system may be operated for long periods of on-stream hydrocarbon processing time, it is advantageous to provide facilities for regeneration of the catalyst by carbon burn-off with an oxygen containing gas. Regeneration may be provided in a blocked-out operation or may be integrated with the processing cycle by providing sufficient reactors for cyclic periods of reaction and regeneration.

In the above example, the invention is applied to monitor the removal of arsenic from the hydrocarbon feed of a fixed bed platinum-alumina reforming system. As noted above, the radioisotope in this operation is advantageously arsenic-73, which has a half life of 76 days, or arsenic-74 which has a half life of 18 days. Also available are arsenic-76, which has a half life of 26.8 hours, and arsenic-77, which has a half life of 40 hours. The radioisotopes may be obtained in the form of the oxide which may be conveniently used for impregnating a shallow layer of the adsorbent bed near the inlet of the guard chamber. The oxide, for example, is dissolved in dilute aqueous alkali or acid to provide a solution for impregnating the adsorbent in a safe but effective concentration. Hydrocarbon solutions for metering into the feed can be prepared using a halide of the radioisotope, e.g. arsenic triiodide or an organic derivative of the isotope, e.g. arsenic diethyl or arsenic triphenyl. Radioisotopes which differ from the contaminating element in the feed also may be used provided they have related adsorptive properties. For example, antimony-125, with a 2.7 year half life, can be used to detect the break-through of arsenic in the guard chamber.

The invention also may be applied to the removal of other metallic and non-metallic contaminating elements or their compounds from feed streams to catalytic processing systems. For example, sodium-24 or potassium-42 are available in the form of carbonates and can be used to monitor the removal of alkali metal contaminants from the feed stream. Iron-59 and sulfur-35 are available in elemental form and are useful for guarding against iron contamination or in detecting the effectiveness of sulfur removal. The form of the processing system can be varied considerably in the practice of the invention. The catalyst in the processing step may be handled in the form of a fixed or moving bed of pellets, tablets or pills, or it may be handled in the form of a fluidized bed in finely divided form.

The adsorbent solid is selected for the contaminant to be removed. Bauxite clay, silica gel and the like are effective for arsenic. Lime, caustic or metal oxides have value for more acidic contaminants.

I claim:

1. In the operation of a catalytic conversion process wherein the feed stream to the catalytic conversion zone is pretreated to remove small quantities of arsenic by passage through a bed of solid adsorbent in an adsorption zone, the improved method of monitoring the adsorptive life of the adsorbent bed in the adsorption zone which comprises introducing radioactive arsenic 73-74 at a point near the inlet to the adsorption zone, detecting the level of radioactivity in the adsorbent bed at a point near the discharge from the adsorption zone, and discontinuing flow through the adsorption zone when a predetermined level of radioactivity is detected.

2. The process of claim 1 in which the feed is a hydrocarbon naphtha charge stock to a catalytic reforming system using a platinum-alumina type catalyst.

3. The process of claim 1 in which the radioactive isotope is introduced as the oxide of arsenic 73-74.

4. The process of claim 1 in which the radioactive isotope is introduced as the triiodide of arsenic 73-74.

5. In the operation of a catalytic conversion process wherein the feed stream to the catalytic conversion zone is pretreated to remove small quantities of a metal contaminant by passage through a bed of solid adsorbent in an adsorption zone, the improved method of monitoring the adsorptive life of the adsorbent bed in the adsorption zone which comprises introducing a radioactive isotope of said metal contaminant at a point near the inlet to the adsorption zone, said radioactive isotope having adsorptive properties corresponding to said metal contaminant, detecting the level of radioactivity in the adsorbent bed at a point near the discharge from the adsorption zone, and discontinuing flow through the adsorption zone when a predetermined level of radioactivity is detected.

6. The process of claim 5 in which the feed is a hydrocarbon naphtha charge stock to a catalytic reforming system using a platinum-alumina type catalyst.

7. The process of claim 5 in which the radioactive isotope of the contaminant metal is introduced by impregnating a shallow layer of the absorbent near the inlet to the adsorption zone.

8. The process of claim 5 in which the radioactive isotope is introduced as a dilute hydrocarbon solution into the feed stream flowing to the adsorption zone.

References Cited in the file of this patent

UNITED STATES PATENTS

| | | |
|---|---|---|
| 2,187,741 | Houdry | Jan. 23, 1940 |
| 2,573,149 | Kassel | Oct. 30, 1951 |

FOREIGN PATENTS

| | | |
|---|---|---|
| 1,064,400 | France | May 13, 1954 |

OTHER REFERENCES

"Chemical Refining of Petroleum," Kalischevsky, Reinhold Publ. Co. (1942), pages 34–35.

"The Oil and Gas Journal," Linz (Radioisotopes), vol. 52, No. 19, pages 106, 108 and 139 (1953).

Hull: Nucleonics, volume 13, No. 4, April 1955, pp. 18–21 relied on.

Wagner et al.: Nucleonics, volume 14, No. 4, April 1956, pp. 78–84 relied on.